United States Patent [19]

Röck et al.

[11] 4,172,316

[45] Oct. 30, 1979

[54] PROCESS FOR HINGEDLY CONNECTING A PAIR OF PIECES OF FURNITURE

[75] Inventors: Erich Röck, Höchst; Bernhard Mages, Dornbirn, both of Austria

[73] Assignee: Julius Blum Gesellschaft m.b.H., Höchst, Austria

[21] Appl. No.: 911,085

[22] Filed: May 31, 1978

Related U.S. Application Data

[63] Continuation-in-part of Ser. No. 732,186, Oct. 13, 1976, abandoned.

[51] Int. Cl.[2] .................... B23P 15/00; E05D 11/00

[52] U.S. Cl. .................... 29/432; 29/434; 29/526 R; 24/211 P; 85/5 P; 16/163; 16/164; 403/350; 403/374

[58] Field of Search .................... 29/434, 432, 432.1, 29/432.2, 526; 24/211 P, 230 AS; 85/5 P; 16/130, 131, 163, 164; 144/3 E, 3 R, 27; 403/350, 374, DIG. 8

[56] References Cited

U.S. PATENT DOCUMENTS

| | | | |
|---|---|---|---|
| 1,174,326 | 3/1916 | Koliha | 16/130 |
| 2,620,539 | 12/1952 | Poupitch | 29/526 |
| 3,224,035 | 12/1965 | Heinze | 16/131 |
| 3,263,723 | 8/1966 | Sheffield et al. | 144/3 R |
| 3,297,065 | 1/1967 | Zenner | 144/3 R |
| 3,313,327 | 4/1967 | Goldstein | 144/27 |
| 3,626,548 | 12/1971 | Grünert | 16/131 |
| 3,744,086 | 7/1973 | Salice et al. | 16/164 |
| 3,863,292 | 2/1975 | Grunert et al. | 16/131 |
| 3,977,043 | 8/1976 | Zernig | 16/163 |
| 3,979,817 | 9/1976 | Cheak | 29/434 |

FOREIGN PATENT DOCUMENTS

| | | | |
|---|---|---|---|
| 2228030 | 1/1974 | Fed. Rep. of Germany | 85/5 P |
| 120992 | 2/1948 | Sweden | 16/163 |

*Primary Examiner*—Francis S. Husar
*Assistant Examiner*—Daniel C. Crane
*Attorney, Agent, or Firm*—Wenderoth, Lind & Ponack

[57] ABSTRACT

Attachment holes are formed in a first piece of furniture, and a dowel hole is formed in a second piece of furniture. A hinge unit includes a hinge arm having attached thereto a mounting plate, a cup-shaped dowel dimensioned to fit within the dowel hole, and a pair of toggle joints connecting the hinge arm and the cup-shaped dowel to form a quadrangular hinge linkage, with the mounting plate having extending therefrom rods dimensioned to fit in the attachment holes. First pins having first hook members are permanently mounted within and rotatably extended through the mounting plate at positions eccentric to the longitudinal axes of the rods. Second pins having second hook members are permanently mounted within and rotatably extended through the cup-shaped dowel at positions adjacent the edge thereof. The hinge unit is positioned in the closed position thereof, and the rods of the mounting plate are inserted into the attachment holes of the first piece of furniture. The first pins are then rotated such that the first hook members are moved outwardly of the rods and are driven into and embedded in the lateral wall surfaces of the attachment holes. The second piece of furniture is then moved in a direction substantially at a right angle to the first piece of furniture until the cup-shaped dowel is inserted into the dowel hole. The second pins are then rotated such that the second hook members are moved outwardly of the cup-shaped dowel and are driven into and embedded in the lateral wall surface of the dowel hole.

4 Claims, 5 Drawing Figures

PROCESS FOR HINGEDLY CONNECTING A PAIR OF PIECES OF FURNITURE

This is a continuation-in-part of application Ser. No. 732,186, filed Oct. 13, 1976, now abandoned.

BACKGROUND OF THE INVENTION

The present invention relates to a process for hingedly connecting first and second pieces of furniture.

More particularly, the present invention is directed to such a process employing a hinge unit of the type including a hinge arm having attached thereto a mounting plate, a cup-shaped dowel, and a pair of toggle joints connecting the hinge arm and the cup-shaped dowel to form a quadrangular hinge linkage.

In the modern furniture industry, hinges of the above type are frequently used, particularly in the kitchen furniture industry, and particularly to hingedly connect a door to a side wall of an article of furniture.

Such hinges make it possible for the doors to rest on the front sides of the side walls of a kitchen cabinet, whereby the doors lift away from the front sides of the cabinet during swiveling of the hinges to open the door. Most hinges of this type allow adjustment of the position of the door with respect to the side wall of the cabinet after assembly. Specifically, such hinges normally allow an adjustment with relation to the direction of the depth of the cabinet and of the door gap, whereby production tolerances can be equalized.

According to the prior art, the assembly of such hinges to the article of furniture is carried out in a manner such that a base plate of the hinge is connected to the side wall of the piece of furniture, and the cup-shaped dowel, onto which the hinge arm proper is fitted by means of the toggle joints, is directly inserted into a corresponding dowel hole in the door. The hinge arm, attached to the door, is then mounted on the base plate which is attached to the side wall.

This known assembly process, however, has certain inherent disadvantages. Firstly, the intermediate alignment of the door is entirely problematical, since the hinge arm and the toggle joint are spaced from the door. Accordingly, the door and the portion of the hinge attached thereto provides a bulky assembly which is difficult to store. Further, the protruding hinge parts, normally formed of metal, may scratch the finish of the door.

Further, during assembly of the door having a substantial portion of the hinge unit mounted thereon to the base plate which is mounted on the side wall, such assembly operation is made more difficult due to the fact that the door is made more heavy due to the weight of substantially all of the hinge unit.

SUMMARY OF THE INVENTION

It is therefore a primary object of the present invention to provide a novel process for hingedly connecting a pair of pieces of furniture which overcomes the above disadvantages.

It is a further object of the present invention to provide such a process whereby the furniture doors may be stored in the condition which they are used during assembly, but separately from the hinge units. Thus, it is possible to easily store plural furniture doors without danger of the doors being scratched by connected portions of the hinge units.

It is an even further object of the present invention to provide such a process which greatly simplifies the overall assembly and connection of a furniture door to a furniture side wall.

The above objects are achieved in accordance with the present invention by the provision of a hinge unit including a hinge arm having attached thereto a mounting plate, a cup-shaped dowel, and a pair of toggle joints connecting the hinge arm and the cup-shaped dowel to form a quadrangular hinge linkage. A first piece of furniture, for example a side wall of an article of furniture, has formed therein attachment holes. The mounting plate of the hinge unit has extending therefrom rods which are dimensioned to fit in the attachment holes. A second piece of furniture, for example a door of an article of furniture, has formed therein a dowel hole dimensioned to receive the cup-shaped dowel.

First pins are permanently mounted within and rotatably extended through the mounting plate and the rods at positions eccentric to the longitudinal axes of the rods. The first pins are provided on a portion only of the respective circumferences thereof with first hook members. Thus, upon rotation of the first pins in a first direction, the first hook members are housed within the bodies of the respective rods. Upon rotation of the first pins in a second opposite direction, the first hook members are moved to a position such that they extend outwardly from the rods.

Similarly, second pins are permanently mounted within to rotatably extend through the cup-shaped dowel at positions adjacent the edge thereof. The second pins are provided on a portion only of the circumferences thereof with second hook members. Thus, upon rotation of the second pins in a first direction, the second hook members are housed within the body of the cup-shaped dowel. However, upon rotation of the second pins in a second opposite direction, the second hook members are moved to positions to extend outwardly from the cup-shaped dowel.

The hinge unit is moved to the closed position thereof such that the cup-shaped dowel extends substantially at a right angle to the hinge arm, and the first and second pins are rotated in the respective first directions thereof, such that the first hook members are housed within the rods and such that the second hook members are housed within the cup-shaped dowel. The hinge unit is then moved toward the first piece of furniture until the rods of the mounting plate are inserted in the attachment holes of the first piece of furniture. The first pins are then rotated in the second opposite direction thereof such that the first hook members are moved outwardly of the rods and are driven into and embedded in the lateral wall surfaces of the attachment holes. The mounting plate and the entire hinge unit are thereby fixed to the first piece of furniture.

The second piece of furniture is then aligned to extend at substantially a right angle to the first piece of furniture, and the thus aligned second piece of furniture is then moved toward the first piece of furniture until the cup-shaped dowel of the hinge unit is inserted into the dowel hole in the second piece of furniture. The second pins are then rotated in the second opposite direction thereof such that the second hook members are moved outwardly from the cup-shaped dowel and are driven into and embedded in the lateral wall surface of the dowel hole. The second piece of furniture is thereby fixed to the cup-shaped dowel, and further the first and second pieces of furniture are thereby hingedly connected.

In accordance with a further feature of the invention, the cup-shaped dowel may be formed to be integral with a casing which has depending therefrom a guide dowel which is spaced from the cup-shaped dowel. Thus, a guide hole is further formed in the second piece of furniture at a position spaced from the dowel hole therein by a distance equal to the distance between the guide dowel and the cup-shaped dowel. Thus, when the second piece of furniture is moved toward the first piece of furniture and toward the hinge unit, as the cup-shaped dowel is inserted into the dowel hole, the guide dowel is simultaneously inserted into the guide hole.

BRIEF DESCRIPTION OF THE DRAWINGS

Other objects, features and advantages of the present invention will be more apparent from the following detailed description, taken with the accompanying drawings, wherein.

DETAILED DESCRIPTION OF THE INVENTION

With reference now to the drawings, the process of the present invention will be described in more detail.

Specifically, the present invention is directed to a process for hingedly connecting a first piece of furniture 2 to a second piece of furniture 4 by means of a hinge unit 6. First piece of furniture 2 is preferably a side wall of an article of furniture, for example a kitchen cabinet. Further preferably, second piece of furniture 4 is a door of the article of furniture.

Figure 1:
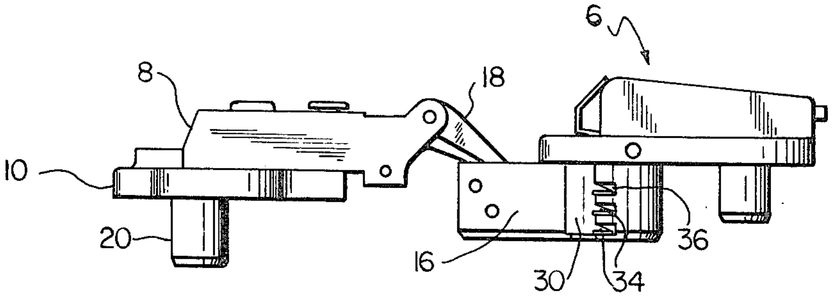
FIG. 1 is a side elevation view of one type of hinge unit, shown in the open position thereof, which may be employed in the process of the present invention for hingedly connecting a pair of pieces of furniture.

Hinge unit 6 is of the type including a hinge arm 8 attached to a mounting plate 10 in a known manner, for example by means of a screw 12 which passes through a slot 14 in hinge arm 8 and is threaded into mounting plate 10. A cup-shaped dowel 16 is connected to hinge arm 8 in a known manner by a pair of toggle links or joints 18. Thus, the hinge unit 6 is pivotable about the quadrangular hinge linkage formed by the pair of toggle joints 18 between an open first position, shown in FIGS. 1, 3 and 5, whereat hinge arm 8 and cup-shaped dowel 16 extend in substantially the same plane, and a closed second position, FIGS. 2 and 4, whereat the hinge arm 8 extends at a substantially right angle to the cup-shaped dowel 16.

According to the present invention, mounting plate 10 has extending from the bottom thereof a pair of longitudinal rods 20. Each of rods 20 is provided with a first pin 22 which is permanently mounted within and which rotatably extends through mounting plate 10 and the respective rod 20 at a position eccentric to the longitudinal axis of the respective rod 20. The top of each first pin 22 may have an integral head 24 to provide for rotation of the pin. Each first pin 22 has extending outwardly therefrom, on a portion only of the circumference thereof, at least one first hook member 26. Thus, upon rotation of first pins 22 in a first direction, the respective first hook members are maintained housed within respective recesses 28 in respective rods 20. This position is shown in the lower portion of FIG. 5 of the drawings. However, upon rotation of the respective first pins 22 in a second opposite direction, first hook members 26 are moved to positions to extend outwardly from respective rods 20. This position is shown in the upper portion of FIG. 5 of the drawings.

Furthermore, cup-shaped dowel 16 is provided with second pins 30 which are permanently mounted within and rotatably extend through cup-shaped dowel 16 at positions adjacent the edge thereof. Second pins 30 may have integral with the top thereof suitable heads 32 to allow rotation of the second pins. Each of second pins 30 has extending outwardly therefrom, at a portion only of the circumference thereof, at least one second hook member 34. Thus, upon rotation of each of second pins 30 in a first direction, the respective second hook members 34 are housed within respective recesses 36 in cup-shaped dowel 16. This position is shown in the lower portion of FIG. 5 of the drawings. However, upon rotation of each of the second pins 30 in a second opposite direction, the respective second hook members 34 are moved to positions to extend outwardly from cup-shaped dowel 16. This position is shown in the upper portion of FIG. 5 of the drawings.

The above described hinge unit 6 is employed to hingedly connect first and second pieces of furniture 2 and 4, respectively, in the following manner in accordance with the process of the present invention.

Figure 2:
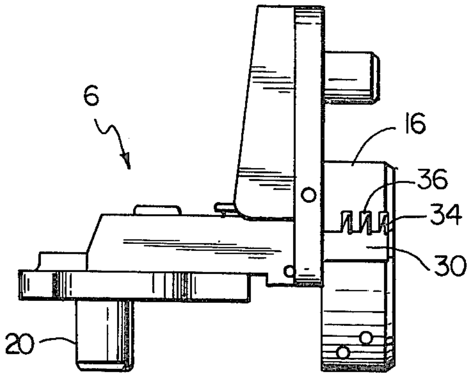
FIG. 2 is a side elevation view of the hinge unit of FIG. 1, but shown in the closed position thereof.
Figure 3:
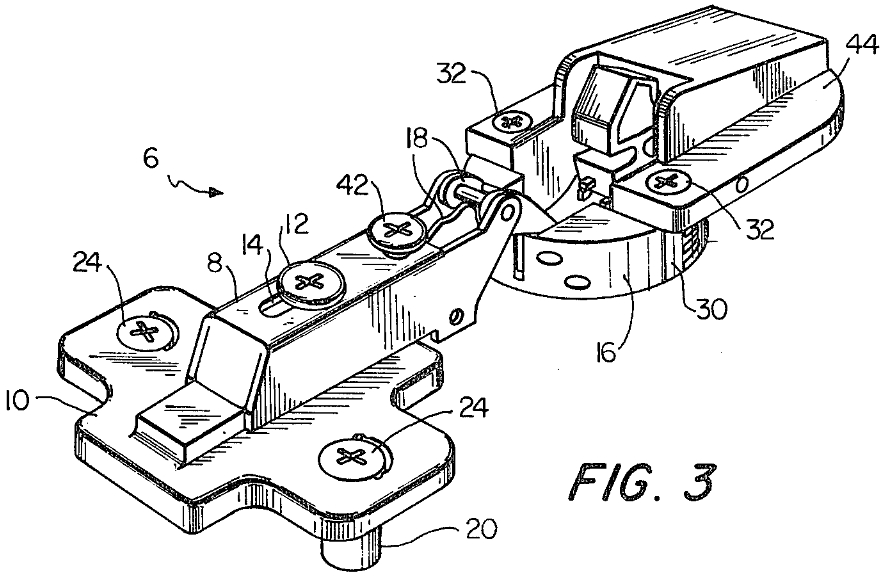
FIG. 3 is a perspective view of the hinge unit of FIG. 1, shown in the open position thereof.

Specifically, hinge unit 6 is moved to the closed position thereof as shown in FIG. 2 of the drawings. First pins 22 and second pins 30 are rotated in the respective first directions thereof such that the first hook members 26 are housed within respective recesses 28 in respective rods 20, as shown in the lower portion of FIG. 5 of the drawings, and such that second hook members 34 are housed within respective recesses 36 within cup-shaped dowel 16, as shown in the lower portion of FIG. 5 of the drawings.

The first piece of furniture 2 has formed therein attachment holes 38 dimensioned to receive therein rods 20. Only one such attachment hole 38 is shown in the drawings, but it is to be understood and will be readily apparent that two such attachment holes are provided. The hinge unit 6 is then moved toward first piece of furniture 2 until rods 20 are inserted into respective attachment holes 38. First pins 22 are then rotated in the respective second opposite directions thereof such that first hook members 26 are moved outwardly of the respective recesses 28 and are driven into and embedded in the lateral wall surfaces of respective attachments holes 38. The mounting plate 10 and the entire hinge unit 6 are thereby fixed to the first piece of furniture 2.

Figure 4:
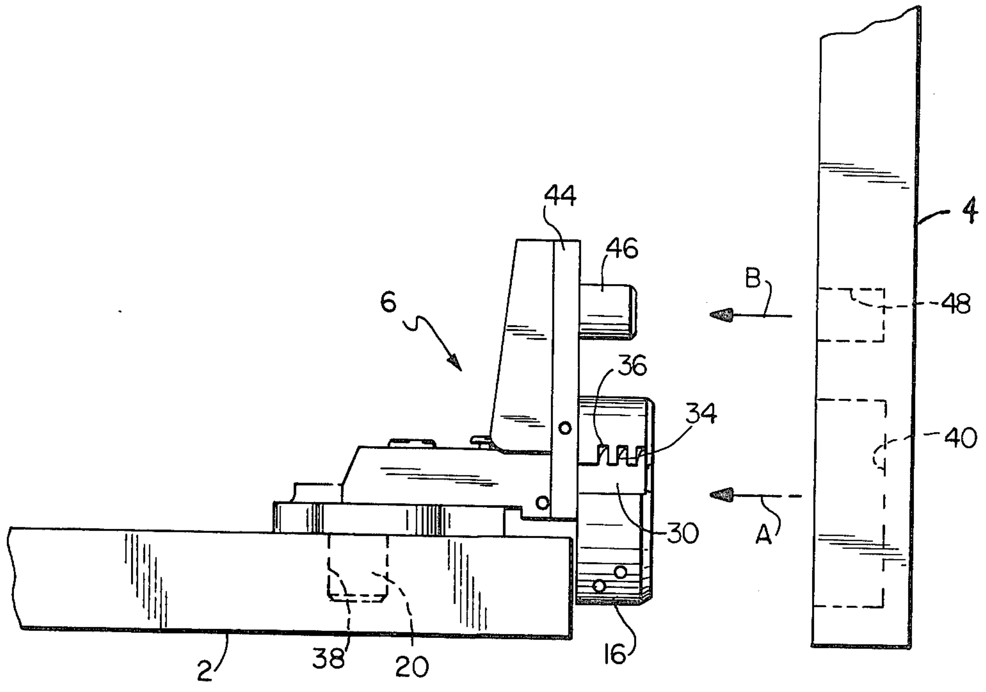
FIG. 4 is an elevation view illustrating the process of the present invention for assembling the hinge unit of FIG. 1 to a pair of pieces of furniture and to thereby hingedly connect the pair of pieces of furniture.
Figure 5:
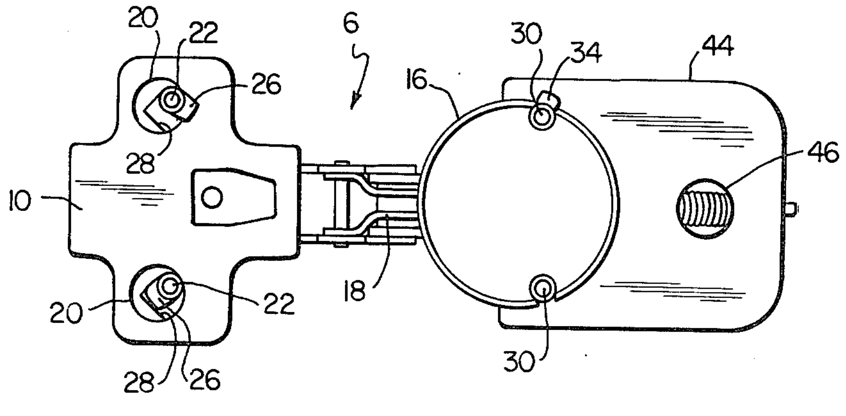
FIG. 5 is a bottom view of the hinge unit of FIG. 1.

The second piece of furniture 4 has formed therein a dowel hole 40 dimensioned to receive therein the cup-shaped dowel 16. The second piece of furniture 4 is aligned to extend at substantially a right angle to the first piece of furniture 2, as shown in FIG. 4 of the drawings. The thus aligned second piece of furniture 4 is then moved toward the first piece of furniture 2 and the cup-shaped dowel 16, as shown by arrow A of the drawings, until the cup-shaped dowel 16 is inserted into the dowel hole 40. The second pins 30 are then rotated in the respective second opposite directions thereof such that the second hook members 34 are moved outwardly of the respective recesses 36 and are driven into and embedded in the lateral wall surface of dowel hole 40. Thereby, the cup-shaped dowel is fixed to the second piece of furniture. Furthermore, by the above operations, the second piece of furniture 4 is hingedly connected to the first piece of furniture 2.

The relative positions of first and second pieces of furniture 2 and 4, respectively, in the direction of the depth of the article of furniture, i.e. in a horizontal direction with respect to FIG. 4 of the drawings, may be adjusted in a conventional manner by means of elongated slot 14 and screw 12. Similarly, the relative position of second piece of furniture 4 with regard to first piece of furniture 2, taken in a vertical direction as shown in FIG. 4 of the drawings, may be conventionally adjusted by means of second screw 42 which screws into hinge arm 8 and which abuts against mounting plate 10.

In accordance with a further feature of the present invention, cup-shaped dowel 16 may be provided with an integral casing 44 which has depending therefrom a guide dowel 46 which is spaced from cup-shaped dowel 16. Thus, in this embodiment of the invention, second piece of furniture 4 has formed therein a guide hole 48 at a position spaced from dowel hole 40 by a distance equal to the distance between guide dowel 46 and cup-shaped dowel 16. Thus, during assembly of the system, and specifically when the second piece of furniture 4 is moved toward the first piece of furniture 2, guide dowel 46 becomes inserted in guide hole 48, as indicated by arrow B in FIG. 4 of the drawings. This embodiment of the present invention provides a more rigid structure, for example when the weight of second piece of furniture 4 is substantial.

Although the process of the present invention has been described with regard to hingedly connecting first and second pieces of furniture 2 and 4, respectively, with only a single hinge unit 6, it is to be understood that it is intended to be within the scope of the present invention to hingedly connect first piece of furniture 2 with second piece of furniture 4 by means of two or more of the hinge units 6. Such process would be achieved in precisely the same manner as discussed above.

Although specific features and steps have been described above in detail, it will be apparent that various modifications may be made thereto without departing from the scope of the present invention.

We claim:

1. A process for hingedly connecting a pair of pieces of furniture, said process comprising:

forming attachment holes in a first piece of furniture;

forming a dowel hole in a second piece of furniture;

providing a hinge unit including a hinge arm having attached thereto a mounting plate, a cup-shaped dowel dimensioned to fit within said dowel hole, and a pair of toggle joints connecting said hinge arm and said cup-shaped dowel to form a quadrangular hinge linkage, with said mounting plate having extending therefrom rods dimensioned to fit in said attachment holes, said hinge unit being pivotable about said quadrangular hinge linkage between an open first position whereat said hinge arm and said cup-shaped dowel extend in substantially the same plane and a closed second position whereat said hinge arm extends at a substantially right angle to said cup-shaped dowel;

providing first pins permanently mounted within and rotatably extending through said mounting plate and said rods at positions eccentric to the longitudinal axes of said rods;

providing said first pins with first hook members, such that upon rotation of said first pins in a first direction said first hook members are housed within said rods, and upon rotation of said first pins in a second opposite direction said first hook members extend outwardly from said rods;

providing second pins permanently mounted within and rotatably extending through said cup-shaped dowel at positions adjacent the edge thereof;

providing said second pins with second hook members, such that upon rotation of said second pins in a first direction said second hook members are housed within said cup-shaped dowel, and upon rotation of said second pins in a second opposite direction said second hook members extend outwardly from said cup-shaped dowel;

positioning said hinge unit in said closed position thereof;

rotating said first and second pins in said first respective directions thereof, such that said first hook members are housing within said rods and such that said second hook members are housed within said cup-shaped dowel;

inserting said rods in said attachment holes of said first piece of furniture;

rotating said first pins in said second opposite direction thereof such that said first hook members are moved outwardly of said rods and are driven into and embedded in the lateral wall surfaces of said attachment holes, thereby fixing said mounting plate and said hinge unit to said first piece of furniture;

aligning said second piece of furniture to extend at substantially a right angle to said first piece of furniture, and moving the thus aligned second piece of furniture toward said first piece of furniture until said cup-shaped dowel is inserted into said dowel hole; and rotating said second pins in said second opposite direction thereof such that said second hook members are moved outwardly of said cup-shaped dowel and are driven into and embedded in the lateral wall surface of said dowel hole, thereby fixing said cup-shaped dowel to said second piece of furniture, and thereby hingedly connecting said first and second pieces of furniture.

2. A process as claimed in claim 1, wherein said first piece of furniture comprises a side wall of an article of furniture, and said second piece of furniture comprises a door of said article of furniture.

3. A process as claimed in claim 1, wherein said cup-shaped dowel is integral with a casing having depending therefrom a guide dowel spaced from said cup-shaped dowel, and further comprising forming a guide hole in said second piece of furniture at a position spaced from said dowel hole therein by a distance equal to the distance between said guide dowel and said cup-shaped dowel, whereby upon said step of moving said second piece of furniture toward said first piece of furniture said guide dowel is inserted in said guide hole.

4. A process as claimed in claim 1, comprising hingedly connecting said first and second pieces of furniture by means of plural said hinge units.

* * * * *